Figure 1:
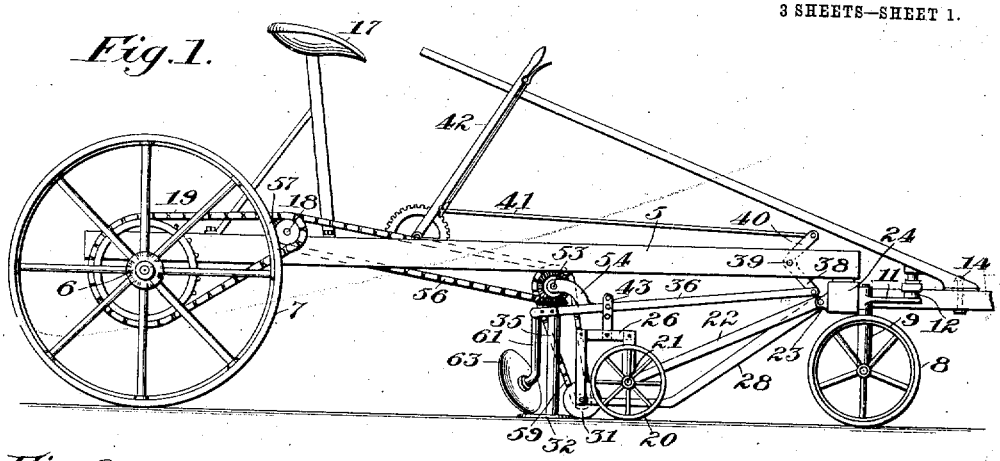

No. 12,708.

REISSUED OCT. 29, 1907.

H. M. HEILIG & M. H. REED.

BEET HARVESTER.

APPLICATION FILED JULY 29, 1905.

3 SHEETS—SHEET 1.

Witnesses:

Blanche R Zappone Jr

Charles Lowell Howard

Inventors:

Herschel M. Heilig,

Merriman H. Reed by W. H. H. Howard Atty

No. 12,708. REISSUED OCT. 29, 1907.

H. M. HEILIG & M. H. REED.

BEET HARVESTER.

APPLICATION FILED JULY 29, 1905.

3 SHEETS—SHEET 2.

Witnesses:

Claude P. Zappone, Jr.

Charles Lovell Howard

Inventors:

Herschel M. Heilig,

Merriman H. Reed, by Wm. T. Howard, Atty.

No. 12,708. REISSUED OCT. 29, 1907.

H. M. HEILIG & M. H. REED.

BEET HARVESTER.

APPLICATION FILED JULY 29, 1905.

3 SHEETS—SHEET 3.

Witnesses:
Claude R. Zappone, Jr.
Charles Lowell Howard

Inventors:
Herschel M. Heilig,
Merriman H. Reed,
by W. T. Hildreth, Atty.

UNITED STATES PATENT OFFICE.

HERSCHEL M. HEILIG, OF CULBERTSON, AND MERIMAN H. REED, OF BLUE SPRINGS NEBRASKA, ASSIGNORS TO SAID HEILIG, AND HUGH SCILLEY, OF LEAVITT, NEBRASKA.

BEET-HARVESTER.

No. 12,708. Specification of Reissued Letters Patent. Reissued Oct. 29, 1907.

Original No. 757,425, dated April 12, 1904, Serial No. 151,761. Application for reissue filed July 29, 1905. Serial No. 272,346.

*To all whom it may concern:*

Be it known that we, HERSCHEL M. HEILIG, a resident of Culbertson, in the county of Hitchcock, and MERIMAN H. REED, a resident of Blue Springs, in the county of Gage, State of Nebraska, citizens of the United States, have invented a new and Improved Beet-Harvester, of which the following is a full, clear, and exact description.

Our invention relates to improvements in beet-harvesters, the same being more especially adapted for service in harvesting sugar-beets, although the machine or parts thereof may be used for other purposes.

In the harvesting of sugar beets, it is desirable to remove all that portion of the top or crown of the beet on which its leaves have grown, this top of the beet containing, as it does, a larger proportion of deleterious salts than does the main body, which salts serve to reduce the extraction of the sugar contained in the beet and to render the extraction more expensive.

Hitherto, mechanical devices for topping beets have been devised to replace the knife used by hand after the beet has been removed from the ground, but such devices, without exception, have cut off slices, or portions of the tops, of uniform thickness from the beets they successively encountered without regard to the varying sizes of the beet crowns, or the portions of the same to be removed. Some of these devices can be set to cut off a thinner or thicker slice from the top; but none, prior to our invention, has possessed the function of automatic adjustment whereby a deep slice is removed from a beet of large crown, and a thinner slice from a beet of smaller crown. The importance and usefulness of this automatic adjustment will be appreciated when it is understood that in the same row, and adjacent to or within short distances of each other, beets are found with crowns of extreme variation in size. It is also true that the size of the crown and the portion of the same which should be removed in preparation of the beet for the factory is directly proportioned in each beet to the height to which such beet extends or grows above the ground. Consequently, our invention, which automatically removes a deep slice from the top of a high growing beet and a thinner slice from the top of a lower growing beet, is found, in addition to harvesting the beet, to attain results equally effective and economical with those obtained by the use of the knife operated by hand on each separate beet after its removal from the ground. The mechanism also includes means for ejecting the cut tops and refuse out of the path of the machine. The active parts of certain devices are prevented from being obstructed by accumulations of vegetable matter, and the devices are arranged to automatically adjust and clear themselves from obstructions, such as clods of earth and stones, lying in their path.

Further objects and advantages of the invention will appear in the course of the subjoined description, and the novelty will be defined by the annexed claims.

Reference is to be had to the accompanying drawings, forming a part of this specification, in which similar characters of reference indicate corresponding parts in all the figures.

Figure 2:
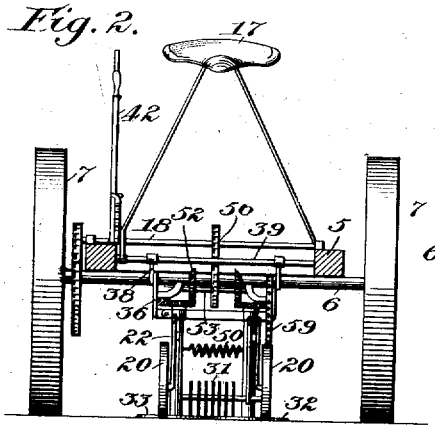
Figure 4:
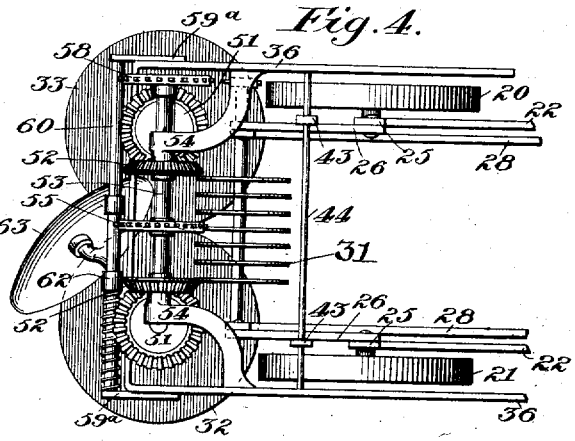
Figure 3:
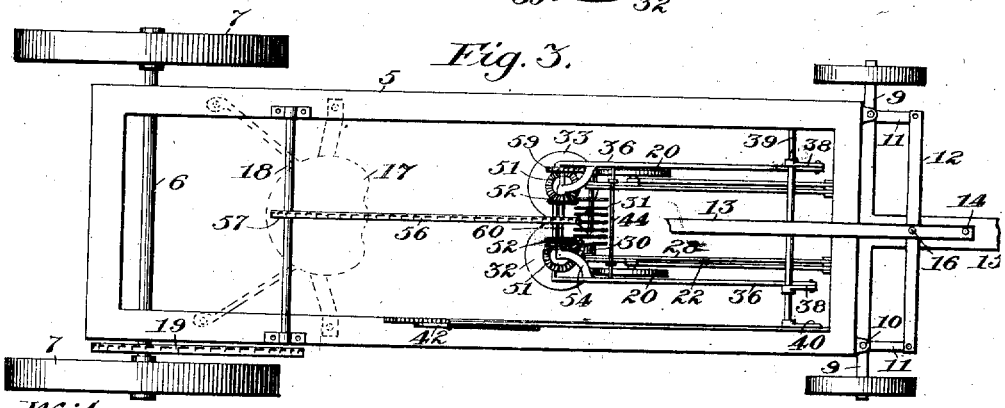
Figure 5:
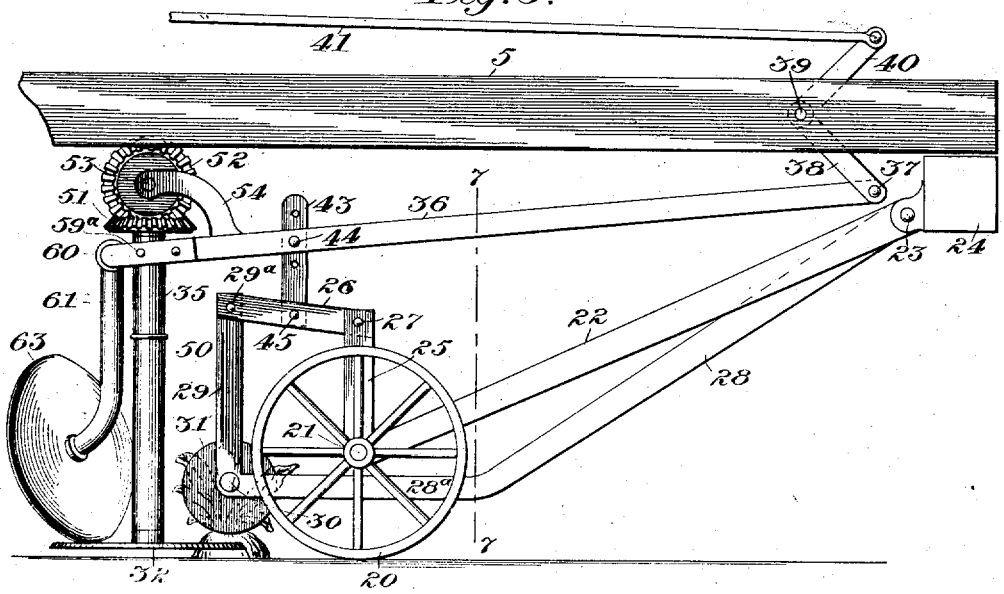
Figure 6:
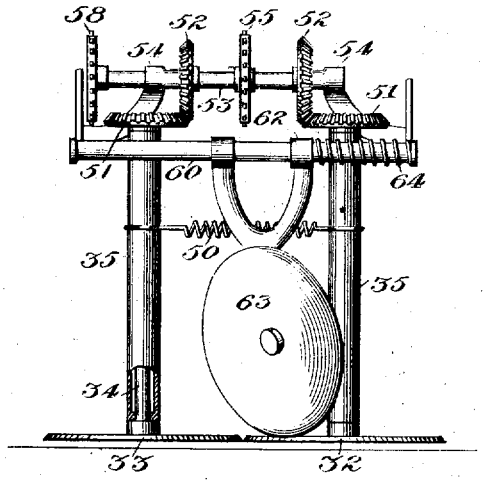
Figure 7:
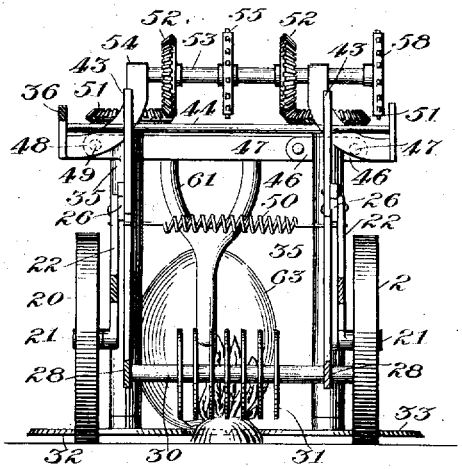
Figure 8:
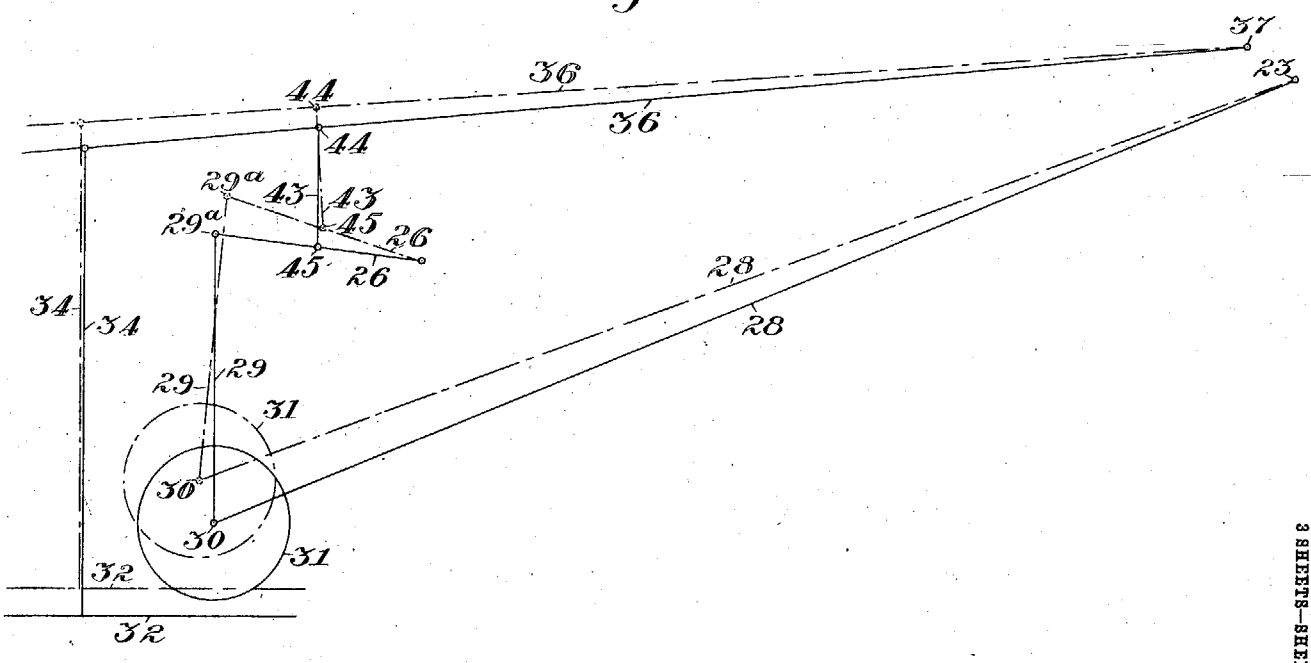

Figure 1 is a side elevation of a portion of a beet-harvester, illustrating our improved topping mechanism in connection therewith. Fig. 2 is a vertical transverse section through the machine. Fig. 3 is a plan view of a portion of the machine, illustrating the position of our topping mechanism, omitting the related parts of the machine. Fig. 4 is an enlarged plan view of the topping mechanism, omitting the related parts of the machine. Fig. 5 is an enlarged view in side elevation of the topping mechanism. Fig. 6 is a rear elevation of the topping mechanism, and Fig. 7 is a vertical cross-section taken in the plane of the dotted lines 7—7 of Fig. 5. Fig. 8 is a diagrammatic view illustrating the relative motions of the gage and cutter mechanisms.

5 designates a main carrying-frame of the machine, which at its rear portion is equipped with a drive-axle 6, having ground-wheels 7. The front portion of the machine is supported by caster-wheels 8, each mounted on a stub-axle 9, having pivotal connection at 10 with the front portion of the frame, and these axles are provided with forwardly-extending arms 11, which are connected by a transverse horizontal bar or rod 12, the latter being pivoted to said arms of the sluing-axles. The axles may be changed, as desired, to any angle relative to the line of draft by means of a lever 13, which is fulcrumed at 14 to the draft-tongue 15. This lever is pivoted at 16 to the connecting-bar 12, and said lever extends in an inclined direction toward a driver's seat 17, supported in a suitable way on the machine-frame. This frame is equipped with a counter-shaft 18, which is operatively connected by sprocket-gearing 19 to the drive-axle 6, and this counter-shaft is adapted to drive the cutting devices and the ejector of the topping mechanism.

The topping mechanism includes suitable gage-wheels 20, which are individually mounted on short stub-axles 21, attached to the side bars 22 of a trailing frame A, said trailing frame being hung or pivoted at 23 to a bolster 24 on the under side of the main frame 5 at the front portion thereof. The side bars 22 of this trailing frame are provided with upstanding arms 25, to which are pivoted the front ends of horizontally-disposed levers 26, said levers being connected to the arms of the trailing frame by bolts 27.

Another trailing frame B has side bars 28, connected to the bolster 24 to turn on the axes afforded by the bolts 23. This last-mentioned trailing frame is wholly independent of the gage-wheel frame A, and its side bars 28 are provided with horizontal lengths 28ᵃ and with upstanding arms 29, said lengths 28ᵃ lying below the axles of the gage-wheels 20, while the arms 29 are disposed in rear of and parallel to the corresponding arms 25 on the gage-wheel frame. These arms 29 of the trailing frame 28 are pivoted by bolts 29ᵃ at their upper ends to the rear portions of the levers 26. The trailing frame B is equipped with a rotary gage adapted to ride upon the protruding upper portion of a beet-plant, and this gage serves to automatically regulate and determine the position of the top-cutter mechanism with relation to the embedded plant in order that said cutter mechanism may operate uniformly on all the plants irrespective of the extent which they project from the ground, and sever therefrom a slice carrying the leaves and of such thickness as the nature of the plant requires. Any suitable construction of this revoluble gage may be employed; but, as shown by the drawings, we use a skeletonized roller or cylinder, consisting of a shaft 30 and a series of disks 31, fixed to said shaft in spaced relation, as represented more clearly by Figs. 2, 3, 4, and 7 of the drawings. The shaft 30 of this revoluble gage is loosely journaled in the knee formed by the union of the arms 28ᵃ and 29 of the trailing frame V. The revoluble gage is disposed practically between the gage-wheels 20 and in rear of the axes thereof, and this gage is adapted to be positively driven by suitable gear connections with the counter-shaft 18, as will presently appear.

The cutter mechanism for severing the tops form the embedded beet-plants contemplates the employment of a pair of coöperative disks 32, 33, each disk having a beveled periphery forming a cutter edge and said disks being mounted or assembled for the cutting edges thereof to have meeting or overlapping engagement, substantially as shown in the drawings. These cutting-disks are adapted to be positively rotated in directions toward each other, and said disks are supported or carried to travel quite close to the ground, although the space between the ground and the disks may be varied automatically by the operation of the revoluble gage, or said space may be determined by manual adjustment effected by devices to be hereinafter described.

The coöperating disks 32, 33 are secured rigidly to the lower portions of vertical shafts 34, said shafts being suitably journaled in bearings provided in vertical elongated sleeves 35. These sleeves practically inclose the shafts throughout their length, and said sleeves are attached to an adjustable frame 36, which is shown by Figs. 1 and 5 as being arranged in a downwardly and rearwardly inclined position. The front ends of the frame-bars 36 are pivoted by bolts 37 to depending arms 38 on a rock-shaft 39, journaled in the main frame 5, and this rock-shaft is provided with an upstanding arm 40, to which is pivoted the front end of a link 41, said link extending rearwardly to a hand-lever 42, which is fulcrumed on the main frame at a point within convenient reach of the driver occupying the seat 17. The adjustable frame 36 is connected shiftably and pivotally to upstanding arms 43 by means of bolts 44, and these arms 43 are pivoted at their lower ends by bolts 45 to the levers 26, said levers connecting the arms 25, 29 of the trailing frames A and B, one of said trailing frames, A, being sustained by the gage-wheels 20.

The frame 36 may be of any suitable character; but, as shown by the drawings, particularly Figs. 3 and 4, this frame is U-shaped. The cross-bar of said pivoted frame serves as the means for supporting the sleeves 35 of the cutter-shafts 34. If desired, these sleeves may be yieldably mounted on the suspended frame 36 in a suitable way; but we prefer to provide one of the sleeves 35 with lugs 46, which are fastened rigidly, as at 47, to the cross-bar of said frame 36. (See Fig. 7.) The other sleeve of the cutter-shaft is provided with a single lug 48, having pivotal connection at 49 to the cross-bar of the suspended frame, as indicated by dotted lines in Fig. 7, and the sleeves 35 are normally held in their proper positions by means of a coiled coupling-spring 50, the end portions of which are fastened to the respective sleeves, as shown by Figs. 6 and 7. The upper ends of the cutter-shafts 34 are provided with bevel-gears 51, which have intermeshing engagement with similar bevel-gears 52, which are made fast with a driving-shaft 53, the latter being journaled in appropriate bearings 54, provided on the suspended frame 36. This shaft 53 is provided at its middle portion with a sprocket-wheel 55, which is engaged by a sprocket-chain 56, extending rearwardly to a sprocket-wheel 57 on the counter-shaft 18, whereby the shaft 53 serves to drive the cutter-shafts and the cutter-disks simultaneously in opposite directions. This cutter-driving shaft is also provided with a sprocket-wheel 58, engaged by a sprocket-chain 59, that leads to a suitable sprocket on the shaft 30 of the revoluble gage, and the gearing for driving this gage should be so proportioned that the peripheral speed of said gage will exceed the speed of travel of the machine.

The frame 36 is also equipped with short rearwardly-extending arms 59ᵃ, adapted to support a horizontal arbor or spindle 60, the latter lying parallel to and in rear of the cutter-driving shaft 53. On this spindle is loosely fitted a hanger 61, the same being forked at its upper portion and provided with rings or sleeves 62, said sleeves being fitted loosely on the arbor to turn freely thereon. The hanger 61 depends for a suitable distance below its supporting-arbor, and to the lower portion of this hanger is fitted a revoluble ejector 63, the latter being in the form of a concavo-convex disk. This disk-shaped ejector is arranged in an oblique or diagonal position to the line of draft and to the plane of the coöperating cutter-disks 32, 33. Said ejector-disk lies at an angle to the line of draft and directly in the path of the tops which are cut from the embedded beet-plants by the operation of the coöperating disks 32, 33. The arbor 60 sustains a strong coiled spring 64, which is fitted loosely around said arbor, one end of the spring being attached to the arbor and the other end thereof being connected with the pivoted hanger 61 in a way to normally force said hanger and the ejector-disk toward the front portion of the cutter mechanism. The hanger and the spring coöperate in yieldably presenting the ejector-disk 63 to the upper face of one of the positively-driven cutter-disks 32, and these parts serve to normally hold this ejector-disk in frictional engagement with said cutter-disk for the purpose of driving the ejector-disk by said frictional engagement with a positively-driven cutter-disk. It will be noted that the cutter-disk 33, its shaft 34, and the pivoted sleeve 35 may yield or give freely in a lateral direction with reference to the companion cutter-disk 32 and the devices associated therewith, whereby the cutter-disks are adapted to open or spread when they meet with an obstruction in the path thereof. In like manner the swiveled hanger 61 and the ejector-disk 63 are free to yield or give in a backward direction should the disk 63 encounter an obstruction, and it will thus be seen that the several operating devices are yieldably supported in a way to prevent injury thereto by obstructing clots of earth, stone, or the like.

The relative movements of the gage-disks 31 and the cutter-disks 32, 33 are shown in Fig. 8. When the parts are in the positions indicated by full lines, the disks 31 will pass over low growing beets without being appreciably acted upon. The cutter disks 32, 33, will at this time be so adjusted as to sever the minimum portion from a beet. Should the disks 31 strike a high growing beet, the parts will be moved to the positions shown by dotted lines, which indicate that the space between the gage-disks 31 and the cutter-disks 32, 33 is greater than when the gage-disks act on a low growing beet. This increased distance is necessary inasmuch as a greater portion of the top of a high growing beet must, for the reasons hereinbefore given, be removed.

The means for gradually and automatically increasing the distance between the cutter-disks 32, 33 and the gage-disks 31 form the essential feature of this part of our invention, and are found in the several levers and connections arranged as herein described. The gages disks 31 are mounted on one end of the pair of upstanding arms 29, the opposite ends of said arms being pivoted to the levers 26, the opposite ends of said levers having pivotal connection with a substantially fixed support. The upstanding pivoted arms 43 extend from the center of the levers 26 to the swinging adjustable frame 36. Thus the frame 36, at the point of connection with the arms 43, moves but one half the distance traveled by the gage disks 31. The cutter mechanism is also attached to the frame 36 at its swinging end; but as the distance between the cutter mechanism and the pivotal point of the arms 43 is less than that between said pivotal point and the fulcrum of the frame 36, the cutter disks are not raised as rapidly as are the gage disks 31; and hence the distance between them increases as the gage disks are raised when riding over a beet, in proportion as that beet projects above the ground; and, as the size of the top of the beet it is desired to remove is in direct proportion to the extent or height to which the beet projects above the surface, the topper operates automatically to remove a deep slice from a beet having a high crown, and a thin slice from one having a flat crown, thus removing the exact portion which is unsuited for the extraction of sugar, without any waste of the body of the beet desirable for manufacture.

In the operation of the improved machine the elevation of the top-cutter mechanism may be readily determined and changed by the driver manipulating the lever 42. It is evident that a rearward pull on this lever will rock the shaft 39 and raise the arm 38, which imparts an upward movement to the front end of the frame 36, the latter turning on the fulcrum afforded by the bolts 44, thus lowering the rear end of the frame 36, the weight of which is borne by the gage-wheels 20, transmitted through the arms 43, the levers 26, and the arms 25 of the trailing frame A. The machine is drawn by a team of horses hitched to the draft-pole 15, and as it moves over a row of beet-plants the coöperating cutters 32, 33 are positively driven by motion derived from the main axle 6 and transmitted through the sprocket-gearing to the counter-shaft, the shaft 53, and the bevel-gears heretofore described. At the same time the revoluble gage is positively driven by the sprocket-gearing from the cutter-driving shaft 53′; and when said gage rides over a beet-plant that projects above the ground beyond a certain distance this gage will elevate the rear part of the pivoted trailing frame B, thus turning the levers 26 on the fulcra afforded by the bolts 27 and, lifting the arms 43, raise the frame 36, whereby the cutter mechanism is bodily raised so that the disks 32, 33 will be made to operate on an elevated plant in a way to cut the top therefrom similarly to the cutting operation on beet-plants which project above the ground a shorter distance. The cutter mechanism moving vertically to a less extent than the gage, a greater proportion of a high growing, or large crowned, beet will be removed than of a lower growing, or smaller crowned, beet.

Although we have shown and described our improved beet-top-cutting mechanism in connection with a beet-harvester of a particular type, it will be understood that we reserve the right to use the top-cutting mechanism in connection with other styles of machines and that we may use parts or all of the top-cutting mechanism herein shown and described.

Having thus described our invention, we claim as new and desire to secure by Letters Patent—

1. A beet-harvester having a main frame, a positively-driven cutter mechanism, means for suspending said cutter mechanism from said main frame, a wheeled trailing frame, a gage carried by said frame, and means connecting said trailing frame with the cutter-suspending means for automatically changing the height of the cutter mechanism when the gage encounters a beet-plant, substantially as set forth.

2. A beet-harvester having a main frame, a top-cutter mechanism, means for suspending said cutter mechanism from said main frame, adjusting devices including a revoluble gage adapted to encounter projecting beet-plants and a wheeled trailing frame movable independently of the main frame, and lever connections between the trailing frame and the cutter-suspending devices for varying the height of the latter without affecting the main frame, substantially as set forth.

3. A beet-harvester having an adjustable cutter-frame, coöperating cutter devices suspended from said frame, a wheeled gage-frame carrying a revoluble gage, and automatic adjusting mechanism controllable by said wheeled gage-frame and connected operatively with said cutter-frame for varying the height of the latter when a part of the gage-frame encounters a projecting beet-plant, substantially as set forth.

4. In a beet-harvester, a top-cutting mechanism having a pair of coöperating cutter-disks, means for positively driving said disks, a pivoted frame carrying said cutter mechanism, a wheeled trailing frame, a trailing gage-frame carrying a gage, and means connecting the several frames for varying the height of the cutter-frame automatically when the gage encounters an obstruction in its path, substantially as set forth.

5. In a beet-harvester, a pivoted frame suspended from a main frame, a pair of coöperating disks disposed in lapping engagement and carried by said pivoted frame, means for holding said disks in coöperative relation and permitting them to spread automatically, means for driving said disks, a trailing wheeled frame, a trailing gage-frame carrying a revoluble gage, and lever connections between the gage-frame, the wheeled frame, and the cutter-frame for automatically changing the height of the cutter mechanism, substantially as set forth.

6. In a beet-harvester, the combination with a main frame, of independent trailing frames connected therewith, a lever connecting said trailing frames, a cutter-frame having operative connection with said lever and carrying a suspended cutter mechanism, gage-wheels journaled on one of said trailing frames, and a revoluble gage mounted on the other trailing frame, substantially as set forth.

7. In a beet-harvester, the combination with a main frame, of independent trailing frames, one of said frames having gage-wheels and the other frame supporting a revoluble gage, a cutter-frame, connections between the trailing frames and said cutter-frame, and a cutter mechanism supported by said cutter-frame, said cutter-frame carrying means for positively driving the cutter mechanism and the revoluble gage, substantially as set forth.

8. In a beet-harvester, the combination with a cutter-frame, of a cutter mechanism suspended therefrom, a revoluble gage disposed in advance of the cutter mechanism, means connecting said revoluble gage with said cutter-frame, and devices for positively driving the cutter mechanism and said revoluble gage, substantially as set forth.

9. In a beet-harvester, a revoluble gage consisting of a shaft having a series of disks spaced thereon, in combination with a cutter mechanism disposed in rear of said gage, means actuated by the gage to determine the elevation of said cutter mechanism, and means for positively driving said gage, substantially as set forth.

10. In a beet-harvester, the combination with a cutter mechanism one of the members of which is positively driven, of an ejector-disk disposed obliquely to said cutter mechanism and having frictional engagement with the driven member thereof, substantially as set forth.

11. In a beet-harvester, the combination with a cutter mechanism, of an inclined ejector-disk having frictional engagement with a member of said cutter mechanism, and means for yieldably holding said ejector-disk in operative position, substantially as set forth.

12. In a beet-harvester, the combination with a cutter mechanism, of a hanger pivotally supported in rear of said cutter mechanism, an ejector-disk journaled in said hanger, and a tension device for holding the hanger and disk normally in active relation to the cutter mechanism, substantially as set forth.

13. In a beet-harvester, a revoluble gage and a rotary cutter mechanism, combined with connecting means between the two for causing the cutter mechanism to move vertically to a less extent than the gage, substantially as set forth.

14. In a beet-harvester, a revoluble gage and a rotary cutter mechanism, combined with connections intermediate of said gage and said cutter mechanism, by means of which connections the cutter mechanism is moved vertically to a less extent than the gage, substantially as set forth.

15. In a beet-harvester, a revoluble gage, rotary cutter devices, and connections intermediate of the two, whereby the vertical movement of the gage, due to contact with a beet, is coincidently imparted to the cutter devices, and whereby further the cutter devices are vertically moved to a less extent than the gage, substantially as set forth.

16. A beet-harvester provided with a rotary cutter and a guide roller automatically variable with relation to each other, substantially as set forth.

17. In a beet-harvester, the combination of a rotary cutter and guide roller and means whereby the guide roller varies in its vertical relation to the cutter, substantially as set forth.

18. In a beet-harvester, the combination of a rotary cutter, a guide roller, and means whereby the guide roller causes the cutter to remove from the beet a part proportioned to the height of the beet top, substantially as set forth.

19. In a beet-harvester, a main frame, a rotary cutter supported in a frame vertically adjustable on such main frame, a guide roller mounted in a second vertically adjustable frame, and connections between the adjustable frames whereby the cutter is caused to operate upon the beet at a point proportioned to the height of the crown of the beet, substantially as set forth.

20. In a beet-harvester, a rotary cutter, a guide roller and means whereby the vertical relation between the cutter and the guide roller is automatically adjusted, substantially as set forth.

21. In a beet-harvester, a rotary cutter, a guide roller and means whereby the vertical relation between the cutter and the guide roller is automatically proportioned to the height of the beet above the ground, substantially as set forth.

22. In a beet-harvester, the combination of a vertically adjustable frame carrying a rotary topping device, a vertically adjustable frame carrying one or more guide rollers, and connections between the said frames whereby the guide roller controls the position of the topping device in accordance with the height of the beet top, substantially as set forth.

23. In a beet-harvester, the combination of a vertically adjustable frame carrying a rotary topping device, a vertically adjustable frame carrying one or more guide rollers, and connections between the said frames whereby the guide roller controls the position of the topping device in accordance with the amount to which the beet to be cut projects above the ground, substantially as set forth.

24. In a beet-harvester, the combination of a rotary cutter, a guide roller, and means whereby the vertical relation of such cutter and guide roller is varied proportionately to the height of the beet top, substantially as set forth.

25. In a beet-harvester, the combination of two independently adjustable frames, one carrying a rotary cutter and the other carrying a guide roller, and connections between such frames whereby the adjustment of one frame shall vary the adjustment of the other by an amount proportioned to the work to be done, substantially as set forth.

In testimony whereof we have signed our names to this specification in the presence of two subscribing witnesses.

HERSCHEL M. HEILIG.
MERIMAN H. REED.

Witnesses to the signature of Herschel M. Heilig:
S. E. SOLOMON,
JAS. A. GREEN.

Witnesses to the signature of Moriman H. Reed:
J. S. JONES,
E. B. SMITH.